(12) United States Patent
Yu (10) Patent No.: US 10,707,706 B2
(45) Date of Patent: Jul. 7, 2020

(54) MAGNETIC ROTARY DISC

(71) Applicant: Mobile Magnetic Activated Electricity X, New Taipei (TW)

(72) Inventor: Chien-Chun Yu, New Taipei (TW)

(73) Assignee: MOBILE MAGNETIC ACTIVATED ELECTRICITY X, New Taipei (TW)

( * ) Notice: Subject to any disclaimer, the term of this patent is extended or adjusted under 35 U.S.C. 154(b) by 0 days.

(21) Appl. No.: 16/050,246

(22) Filed: Jul. 31, 2018

(65) Prior Publication Data

US 2019/0393745 A1    Dec. 26, 2019

(30) Foreign Application Priority Data

Jun. 26, 2018 (TW) .............................. 107121934 A (51) Int. Cl.
*H02K 1/27* (2006.01)
*H02K 1/02* (2006.01)
*H02K 53/00* (2006.01)

(52) U.S. Cl.
CPC ................ *H02K 1/27* (2013.01); *H02K 1/02* (2013.01); *H02K 53/00* (2013.01)

(58) Field of Classification Search
CPC ............. H02K 1/27; H02K 1/02; H02K 53/00
See application file for complete search history.

(56) References Cited

U.S. PATENT DOCUMENTS

| 3,168,665 A | * | 2/1965 | Holper | ................... | H02K 7/125 |
| | | | | | 310/112 |
| 3,723,796 A | * | 3/1973 | Mason | ................... | H02K 16/00 |
| | | | | | 310/126 |
| 4,691,119 A | * | 9/1987 | McCabria | ............. | H02K 7/116 |
| | | | | | 290/40 |

(Continued)

FOREIGN PATENT DOCUMENTS

| DE | 4236125 | * | 4/1994 |
| FR | 2476408 | * | 8/1981 |

(Continued)

OTHER PUBLICATIONS https://www.s-cool.co.uk/a-level/physics/magnetic-fields/revise-it/effect-of-ferrous-cores (Year: 2011).*

*Primary Examiner* — Tulsidas C Patel
*Assistant Examiner* — Ahmed Elnakib
(74) *Attorney, Agent, or Firm* — Muncy, Geissler, Olds & Lowe, P.C.

(57) ABSTRACT

The present invention discloses a magnetic rotary disc, which mainly comprises a metal rotary body and a plurality of magnetic elements. The metal rotary body is formed of metal iron, the magnetic elements are arranged on peripheral edge of the metal rotary body in a uniform distribution. Each magnetic element comprises a first magnetic pole portion and a second magnetic pole portion. All of the first magnetic pole portions and the second magnetic pole portions respectively belong to upper portion and lower portion of the magnetic elements. Most particularly, in all magnetic ele- (Continued)

ments, the lower side of the second magnetic pole portion of any magnetic elements and the upper side of the first magnetic pole portion of the other magnetic elements partially attract each other, so that only the magnetic force lines of the first magnetic pole portions are retained outside the peripheral edge of the metal rotary body.

10 Claims, 11 Drawing Sheets

(56) References Cited

U.S. PATENT DOCUMENTS

| | | | | |
|---|---|---|---|---|
| 4,752,706 | A * | 6/1988 | Meszaros | H02K 16/02 310/80 |
| 7,802,494 | B2 * | 9/2010 | Batistic | F16H 37/065 74/665 B |
| 8,288,904 | B1 * | 10/2012 | Bootsma, Jr. | H02K 49/102 310/103 |
| 2003/0090167 | A1 * | 5/2003 | Kajiura | B60K 6/26 310/156.36 |
| 2005/0140230 | A1 * | 6/2005 | Johnson | B60K 6/26 310/112 |
| 2007/0284956 | A1 * | 12/2007 | Petrovich | H02K 7/06 310/80 |
| 2008/0122298 | A1 * | 5/2008 | Roberts | H02K 53/00 310/1 |
| 2012/0139382 | A1 * | 6/2012 | Yamagishi | H02K 1/2766 310/156.61 |
| 2012/0235527 | A1 * | 9/2012 | Lee | H02K 53/00 310/152 |
| 2012/0280588 | A1 * | 11/2012 | Bryson | H02K 53/00 310/156.25 |

FOREIGN PATENT DOCUMENTS

| | | | |
|---|---|---|---|
| JP | S5752783 U | | 3/1982 |
| JP | H 0670494 | * | 3/1994 |
| JP | H0670494 A | | 3/1994 |
| JP | H06335222 A | | 12/1994 |
| JP | H09298864 A | | 11/1997 |
| JP | 2000228865 A | | 8/2000 |
| JP | 2003049762 A | | 2/2003 |
| JP | 2004357489 A | | 12/2004 |
| JP | 6477961 | * | 3/2019 |
| TW | 201348584 | * | 12/2013 |
| WO | WO 03/088457 | * | 10/2003 |

* cited by examiner

MAGNETIC ROTARY DISC

TECHNICAL FIELD

The present invention relates to the design of a motor assembly, especially relates to the structure design of a rotor for the motor.

BACKGROUND

Electric motor may also be referred to as a motor, which is generally applied to various electrical equipment. The main function of the electric motor is to convert electrical energy into mechanical energy, followed by utilizing the converted mechanical energy to generate kinetic energy, so as to drive external electrical equipment to perform rotary motion, linear motion, harmonic motion or other motions. Wherein, the electric motor used to perform rotary motion is applied to various industries, office spaces, living spaces, etc., which is almost ubiquitous around our life and surrounding. As for the electric motor used to perform linear motion, it is a well-known linear motor, which is applied to semiconductor industry, automation industry, large machinery and instrument industry, etc.

Conventional electric motor is generally divided into two assemblies: rotor and stator. As well known in the art, the rotor is a rotatable assembly having coils surrounding and available to pass with the current, and the stator is a fixed assembly having magnetic poles to generate magnetic field. Accordingly, the electric motor is fed by external power source, then the current passes through the coils of rotor, thereby generating the magnetic field. The generated magnetic field interacts with the magnetic field provided by the stator, and on the basis of magnetic principle, which is homopolar repulsion and heteropolar adsorption, a rotary motion is performed to drive external electrical equipment finally.

However, although conventional electric motor has been used commonly, many shortcomings are raised and the improvement thereof is required. For example, the conventional motor structure results in a low efficiency of generating mechanical energy due to the frequent of energy transformation is too much often. In addition, based on the conventional structure with rotor surrounded by the coils, it has certain degree of material loss rate, it is not sufficiently at all.

In view of this, the present inventor has especially reviewed the above issues, and expects to provide a new concept of "Power and Power Cogeneration" and a "Magnetic Rotary Disc" which puts this new concept into practice for use by the public. This is indeed a motive for the present invention intended to create.

SUMMARY OF THE INVENTION

The purpose of the present invention is to provide a magnetic rotary disc. The magnetic rotary disc comprises a metal rotary body and a plurality of magnetic elements. The metal rotary body is formed by metal, and the magnetic elements arranged on peripheral edge of the metal rotary body in a uniform distribution. Each of the magnetic elements respectively comprises a first magnetic pole portion and a second magnetic pole portion, and the first magnetic pole portions and the second magnetic pole portions respectively belong to upper portion and lower portion of the magnetic elements. Wherein the lower side of the second magnetic pole portion of any magnetic elements and the upper side of the first magnetic pole portion of the other magnetic elements partially attract with each other, so that only the magnetic force lines of the first magnetic pole portions are retained outside the peripheral edge of the metal rotary body.

In a preferred embodiment of the present invention, the peripheral edge of the metal rotary body comprises a plurality of slots in corresponding number, so that the attraction of the magnetic elements is provided. The metal rotary body is a circular disc or a circular ring. The amount of the magnetic elements is 2×3 N or 6×N, wherein N is a positive integer between 1 and 16. The magnetic elements are sheet structure having a curvature. The first magnetic pole portion and the second magnetic pole portion of the magnetic elements respectively occupy a half thereof.

In a preferred embodiment of the present invention, if the first magnetic pole portions are N pole, the second magnetic pole portions are S pole, whereas if the first magnetic pole portions are S pole, the second magnetic pole portions are N pole. The upper side of the first magnetic pole portion of any magnetic elements and an additional magnetic element further attract each other, so as to concentrate magnetic force nearby. The first magnetic pole portion of the additional magnetic element further comprises a magnetic force concentration portion and an inclined surface where the magnetic force concentration portion is arranged on. The metal rotary body comprises iron.

The magnetic rotary disc provided by the present invention has its own characteristics of permanent magnetism and can directly interact with the external magnetic field to perform magnetic poles interaction, so that the coils passed through the current can be omitted to generate a magnetic field. In addition, based on only the first magnetic pole portions exposed outside the peripheral edge of the metal rotary body and the magnetic elements arranged on peripheral edge of the metal rotary body in a uniform distribution, a magnetic field with single magnetic pole and uniformly distributed will be generated outside the peripheral edge of the metal rotary body. The magnetic rotary disc only needs extremely small electric energy supply, then high-efficiency magnetic poles interaction with external magnetic fields can be achieved. In other words, through the magnetic rotary disc provided by the present invention, it is only required a very small amount of electric energy to generate a great amount of mechanical energy, and the mechanical energy can generate electric energy more efficiently, thereby implementing the new concept of new concept of "Power and Power Cogeneration".

BRIEF DESCRIPTION OF THE DRAWINGS

The present invention can be understood by utilizing several preferred embodiments in the specification, the detailed description and the following drawings. The same element symbols in the drawings refer to the same elements in the present invention. However, it should be understood that all preferred embodiments of the present invention are only used for illustrative purposes, and not intended to limit the scope of the application.

DETAILED DESCRIPTION

In order to give examiner more understanding of the features of the present invention and advantage effects which the features can be achieve, the preferred embodiments with detailed descriptions will be given. The detailed descriptions are as follows.

Figure 1:
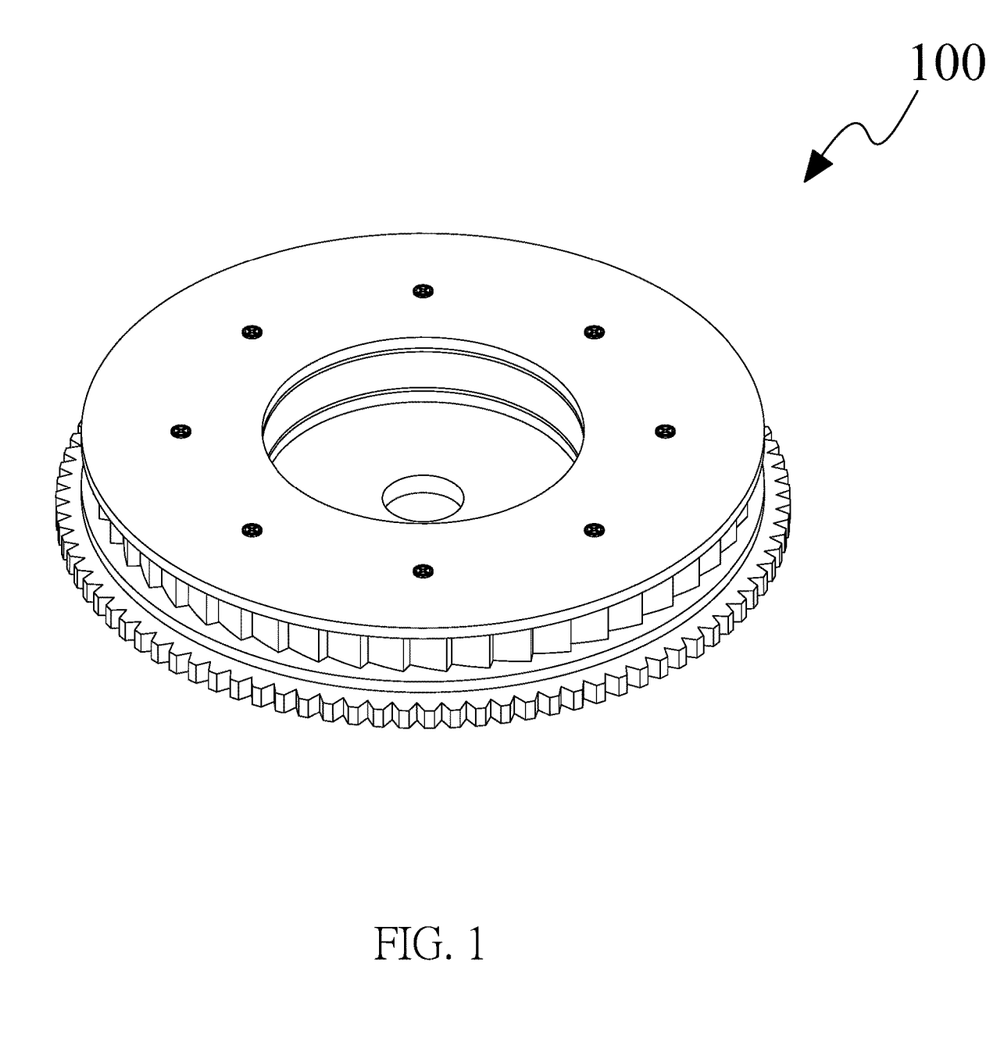
FIG. 1 is a three-dimensional view of the magnetic rotor of the present invention.
Figure 2:
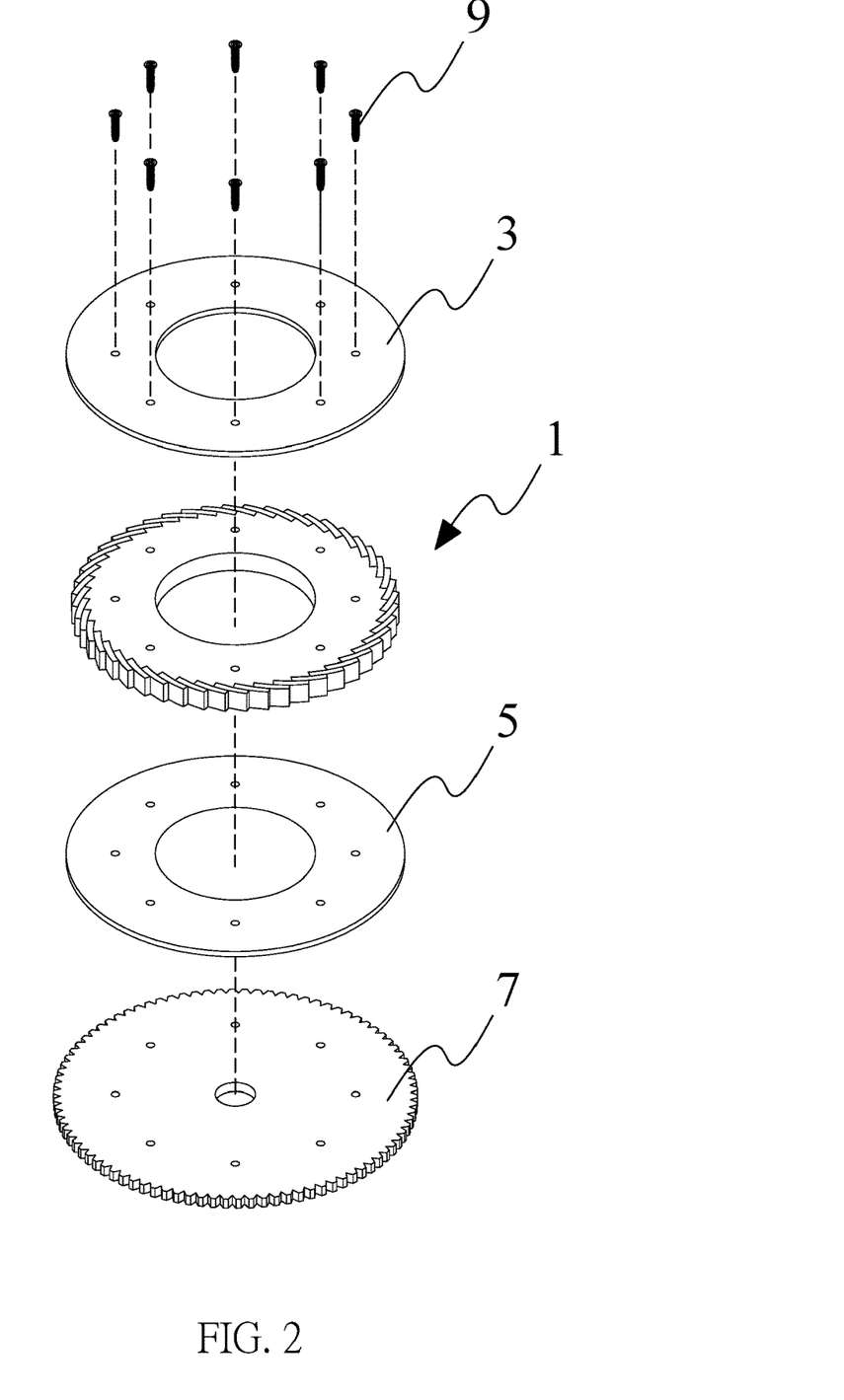
FIG. 2 is a three-dimensional decomposition view of the magnetic rotor of the present invention.

Please refer to FIG. 1 and FIG. 2 at the same time, FIG. 1 and FIG. 2 respectively show a three-dimensional view and a three-dimensional decomposition view of the magnetic rotor of the present invention. In order to achieve the main purpose of the present invention, the embodiment in FIG. 1 and FIG. 2 includes a magnetic rotary disc. As shown in the figures, according to one or more embodiments, the magnetic rotor 100 of the present invention is substantially composed of a magnetic rotary disc 1, a division plate 3, a division plate 5 and a transmission disc 7. The assemblies all have an axial hole aligned with the identical axis, which can be synchronously rotated according to the axial hole, and the assemblies are fixed together by a plurality of fixing elements 9 (exemplified as screws).

As mentioned above, the magnetic rotary disc 1 acts as a core assembly of the magnetic rotor 100, which has characteristics of permanent magnetism, and can generate a magnetic field with single magnetic pole and uniformly distributed. The division plate 3 and the division plate 5 are respectively arranged on the upper side and the lower side of the magnetic rotary disc 1, and the function thereof is to protect the magnetic rotary disc 1 while isolating the magnetic fields on the upper side and the lower side of the magnetic rotary disc 1, so as to limit the distribution of the magnetic fields in a plane while avoiding unnecessary magnetic balance off. The transmission disc 7 is arranged on the lower side of the division plate 5, which has a plurality of transmission teethes arranged on the peripheral edge of the transmission substrate 7. Through the rotation of the transmission disc 7, the mechanical energy generated by the magnetic rotor 100 can effectively drive other electrical equipment.

Figure 3:
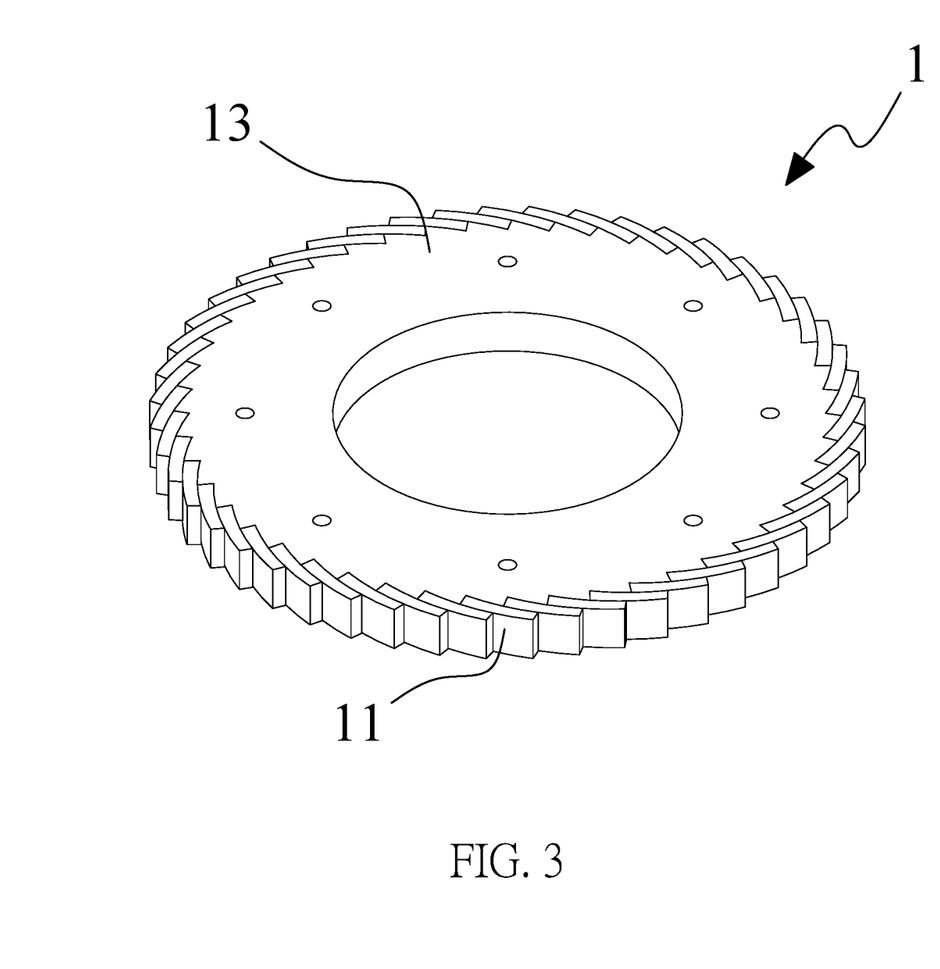
FIG. 3 is a three-dimensional view of the magnetic rotary disc of the present invention.
Figure 4:
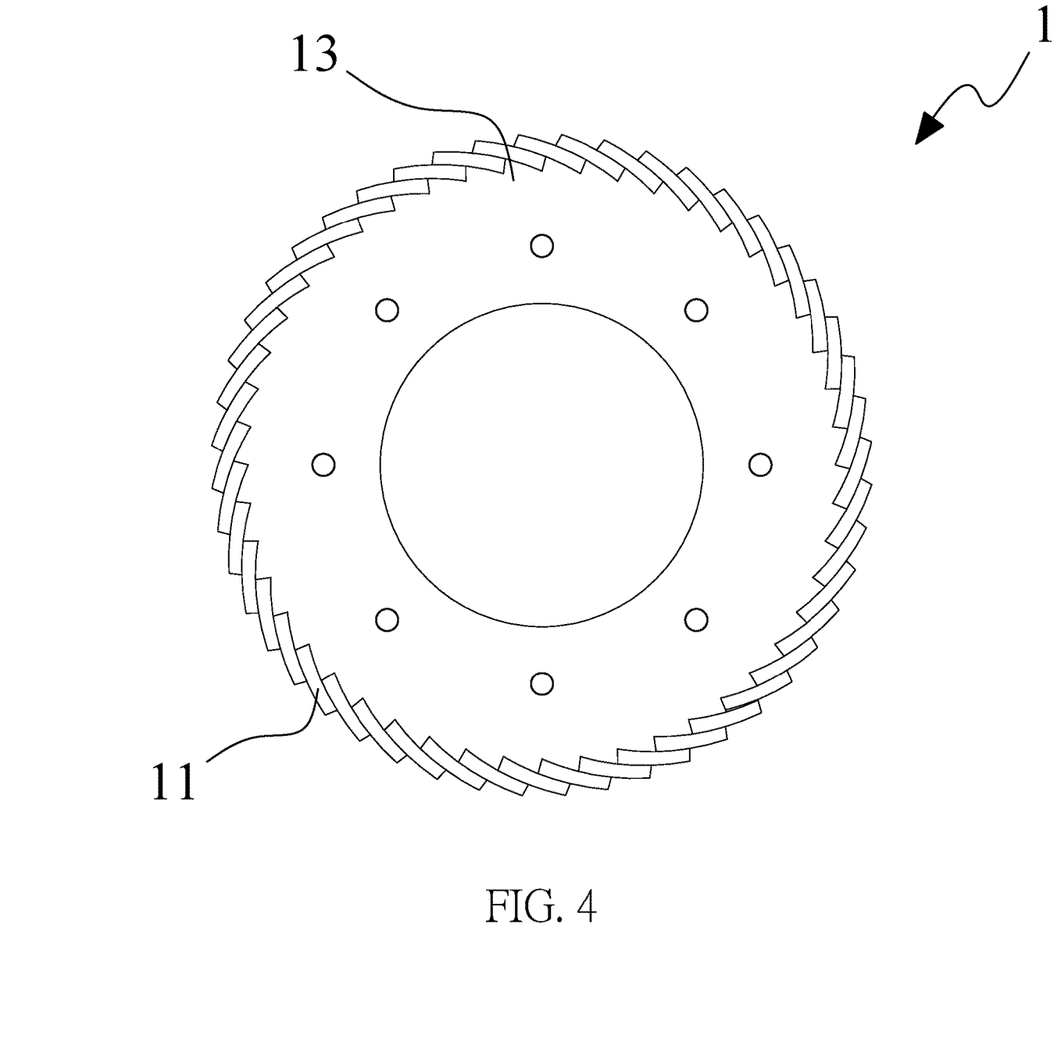
FIG. 4 is a top view of the magnetic rotary disc.

Please refer to FIG. 1 to FIG. 4 simultaneously, wherein FIG. 3 and FIG. 4 respectively show a three-dimensional view and a top view of the magnetic rotary disc of the present invention. As shown in the figures, according to one or more embodiments, the magnetic rotary disc 1 of the present invention is substantially composed of a metal rotary body 13 and a plurality of magnetic elements 11. The metal rotary body 13 is manufactured by metal (exemplified by iron), which may be in the form of a circular disc or a circular ring. The present invention is not limited to any form herein, it may have any suitable appearance. The magnetic elements 11 are arranged on the peripheral edge of the metal rotary body 13 in a uniform distribution. The magnetic elements 11 can be directly attracted on the surface of the peripheral edge of the metal rotary body 13 without other media due to the metal rotary body 13 is formed of metal.

As mentioned above, the magnetic elements 11 can not only be directly attracted on the surface of the peripheral edge of the metal rotary body 13, but also can be attracted with each other in a way of being not completely overlapped. Accordingly, the magnetic elements 11 are arranged on the peripheral edge of the metal rotary body 13 in a uniform distribution. According to one or more embodiments, the magnetic elements 11 may be in the form of sheet structure having a curvature. Based on the presence of the curvature, the magnetic elements 11 can be more efficiently attracted to each other in a way of being not completely overlapped, and then arranged on the peripheral edge of the metal rotary body 13 in a uniform distribution. Similarly, the size of the curvature decides the amount of the magnetic elements 11. According to one or more embodiments, the amount of the magnetic elements 11 is 2×3 N or 6×N, wherein N is a positive integer between 1 and 16. Accordingly, the optimum range of the amount of the magnetic elements 11 is between 6 and 96.

Figure 5:
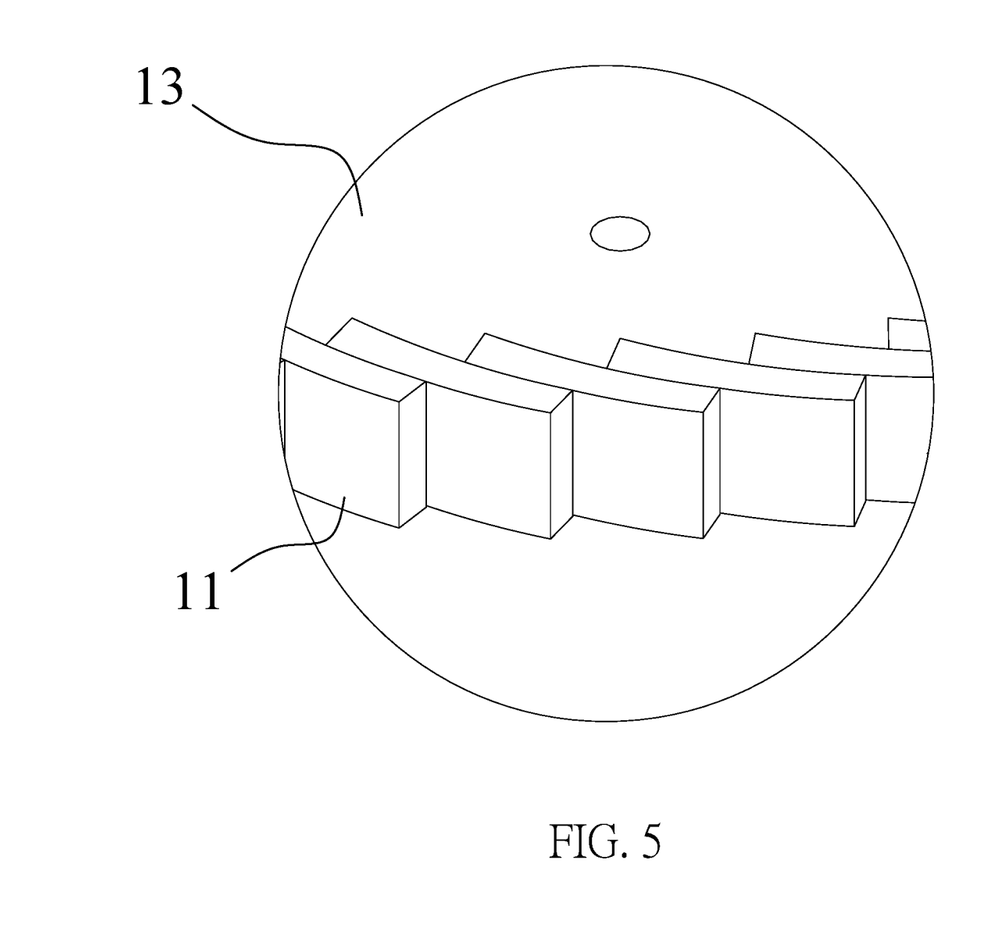
FIG. 5 is the first partial three-dimensional view of the magnetic rotary disc of the present invention.
Figure 6:
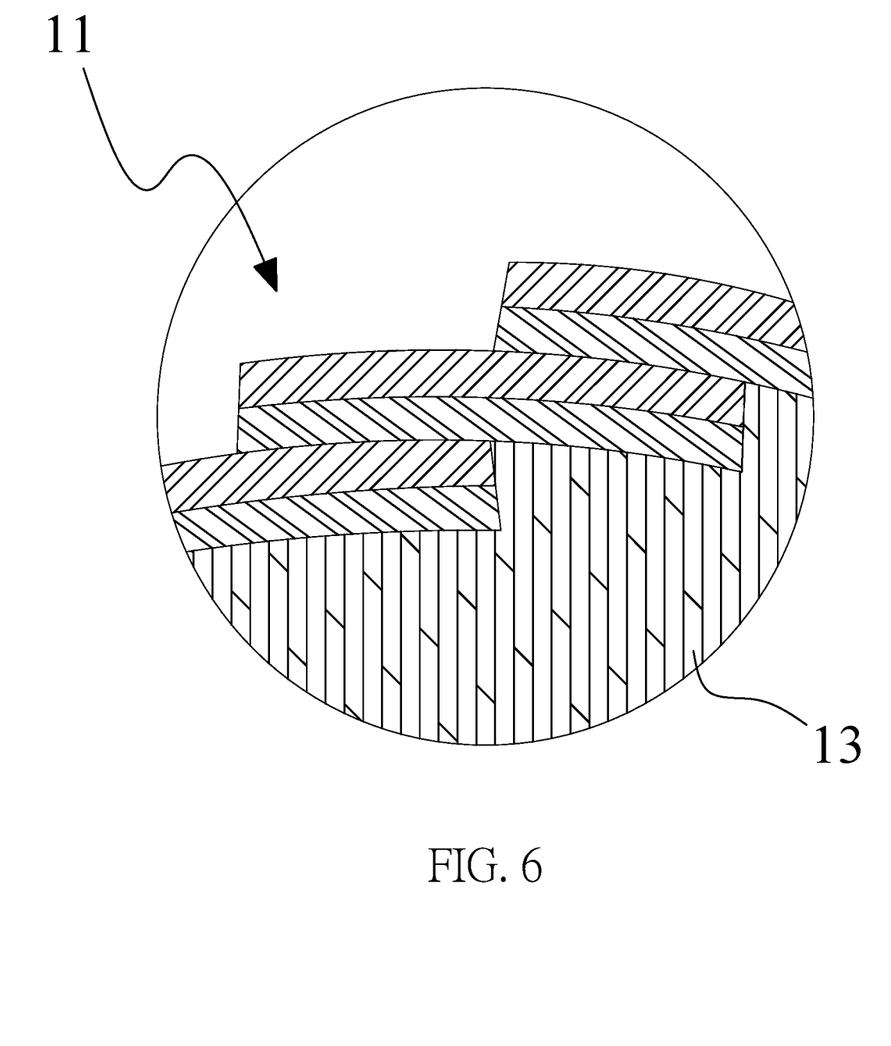
FIG. 6 is the first partial cross-sectional view of the magnetic rotary disc of the present invention.
Figure 7:
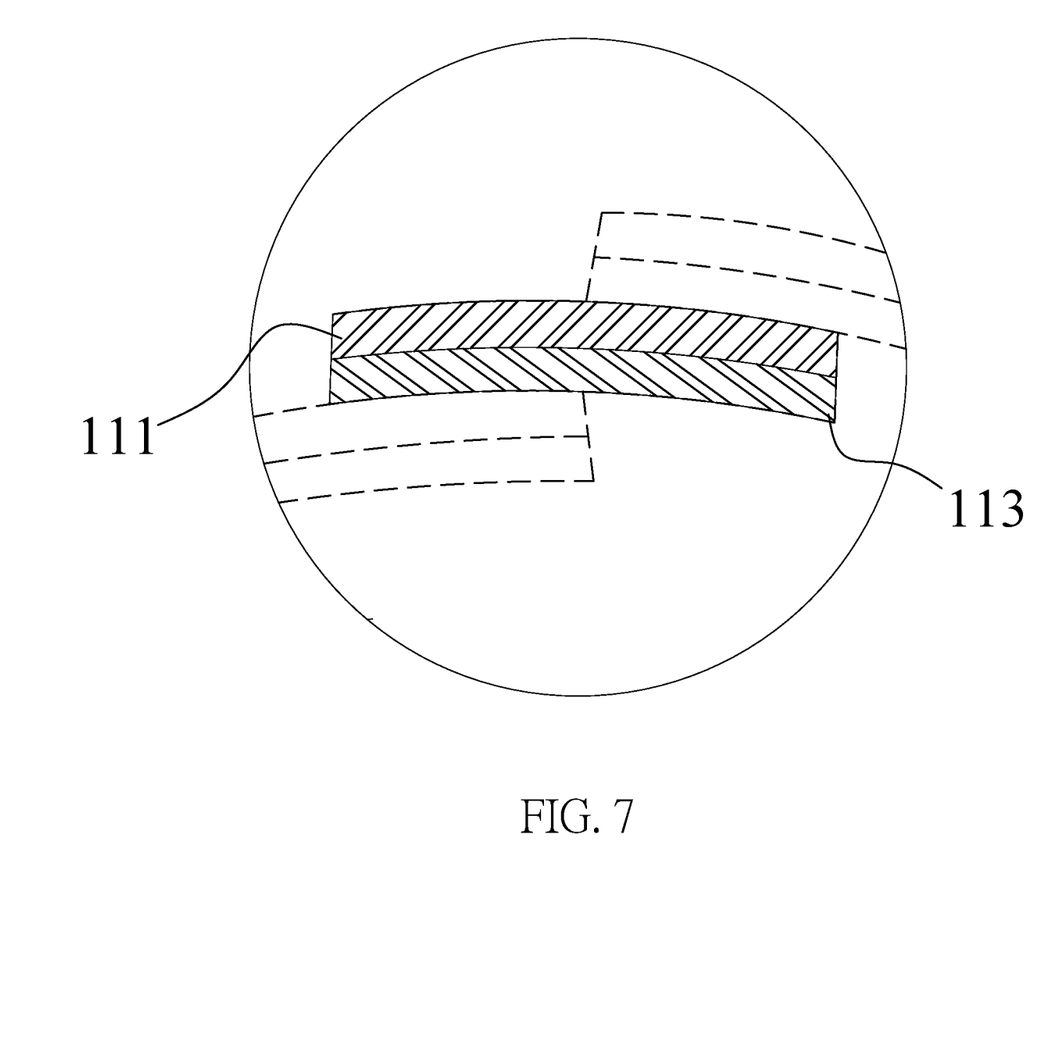
FIG. 7 is the second partial cross-sectional view of the magnetic rotary disc of the present invention.
Figure 8:
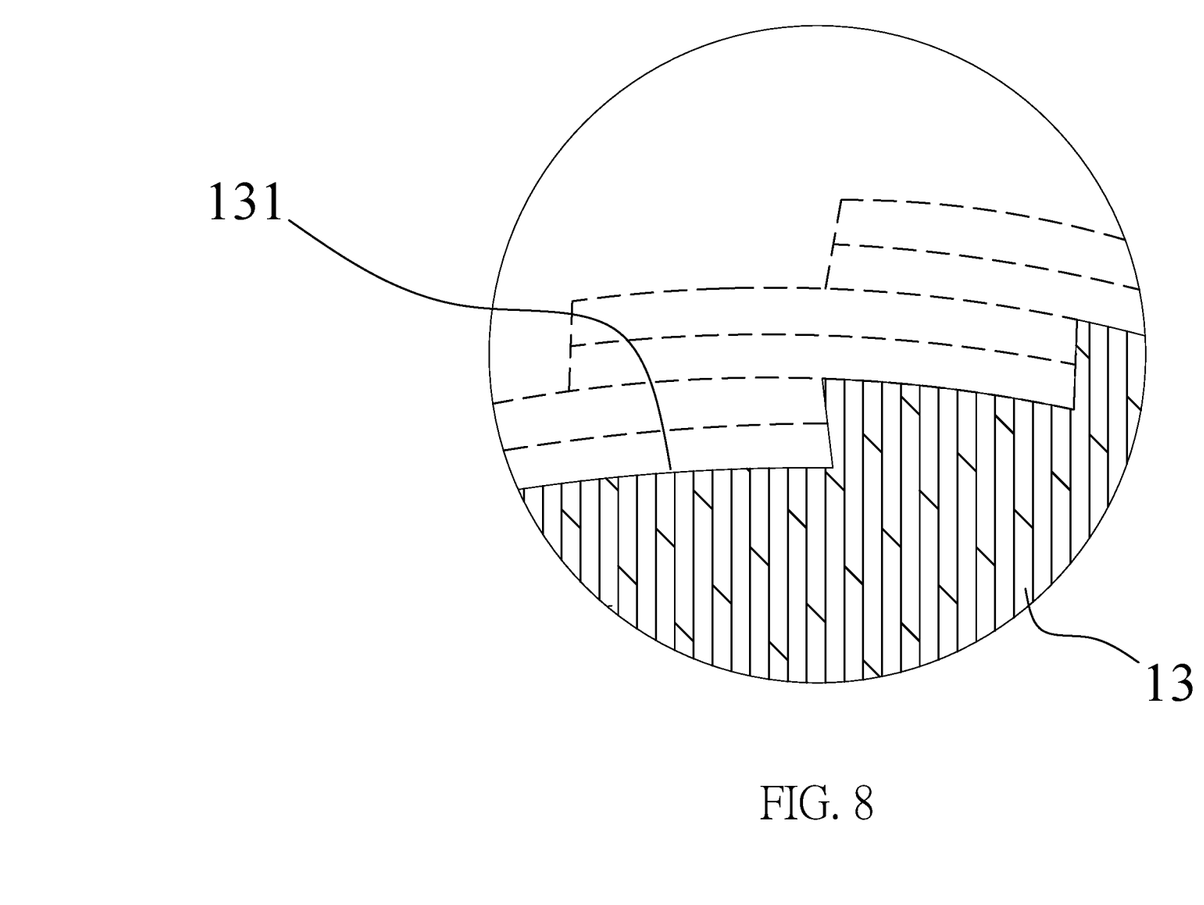
FIG. 8 is the third partial cross-sectional view of the magnetic rotary disc of the present invention.

Please further refer to FIG. 5 to FIG. 8 simultaneously, wherein FIG. 5 shows the first partial three-dimensional view of the magnetic rotary disc of the present invention, and FIG. 6 to FIG. 8 respectively show the first to the third partial cross-sectional view of the magnetic rotary disc of the present invention. As shown in FIG. 6 and FIG. 8, according to one or more embodiments, the peripheral edge of the metal rotary body 13 of the present invention comprises a plurality of slots 131 in corresponding number, so that the adsorption of the magnetic elements 11 is provided. According to the foregoing, since according to the best embodiment of the present invention, the amount of the magnetic elements 11 is between 6 and 96, the amount of the slots 131 should also be between 6 and 96. With the arrangement of the slots 131, the magnetic elements 11 will be more firmly absorbed on the peripheral edge of the metal rotary body 13 in a uniform distribution, because these can be preset and completed. It is worth noting that the lower side of any magnetic elements 11 is not completely absorbed on the corresponding slots 131, because part of them is attracted on the upper side of the other magnetic elements 11.

As shown in FIG. 5 to FIG. 7, according to one or more embodiments, the magnetic elements 11 respectively comprises a first magnetic pole portion 111 and a second magnetic pole portion 113, wherein the first magnetic pole portions 111 and the second magnetic pole portions 113 respectively belong to upper portion and lower portion of the magnetic elements 11. According to one or more embodiments, the lower side of the second magnetic pole portion 113 of any magnetic elements 11 and the upper side of the first magnetic pole portion 111 of the other magnetic elements 11 partially attracted each other. Accordingly, only the magnetic force lines of the first magnetic pole portions 111 are retained outside the peripheral edge of the metal rotary body 13. According to the best embodiment of the present invention, the first magnetic pole portion 111 and the second magnetic pole portion 113 of the magnetic elements 11 respectively occupy to a half thereof, i.e., the shape and size of each magnetic elements 11 are the same and can be magnetized into the first magnetic pole portions 111 and the second magnetic pole portions 113 equally, both occupying half of them. Accordingly, the lower side of the second magnetic pole portions 113 of any magnetic elements 11 can half cover the upper side of the first magnetic pole portions 111 of the other magnetic elements 11, so as to implement that only the magnetic force lines of the first magnetic pole portions 111 are retained outside the peripheral edge of the metal rotary body 13.

It is worth mentioning that, according to one or more embodiments, the first magnetic pole portions 111 and the second magnetic pole portions 113 included in the magnetic elements 11 are not limited to any magnetic poles. In other words, if the first magnetic pole portions 111 are N pole, the second magnetic pole portions 113 are S pole, whereas if the first magnetic pole portions 111 are S pole, the second magnetic pole portions 113 are N pole. The keynote of the present invention is that, there are only the magnetic force lines distribution with single magnetic pole outside the peripheral edge of the metal rotary body 13, whether it is an N pole or an S pole. In addition, since the material of the metal rotary body 13 comprises metal iron and the magnetic elements 11 are directly attracted on the surface of the peripheral edge thereof, the magnetic field between the lower side of the magnetic elements 11 and the metal rotary body 13 will be balanced off. Similarly, the magnetic field between the lower side of the second magnetic pole portions 113 of any magnetic elements 11 and the upper side of the first magnetic pole portions 111 of the other magnetic elements 11 will be also balanced off.

Figure 9:
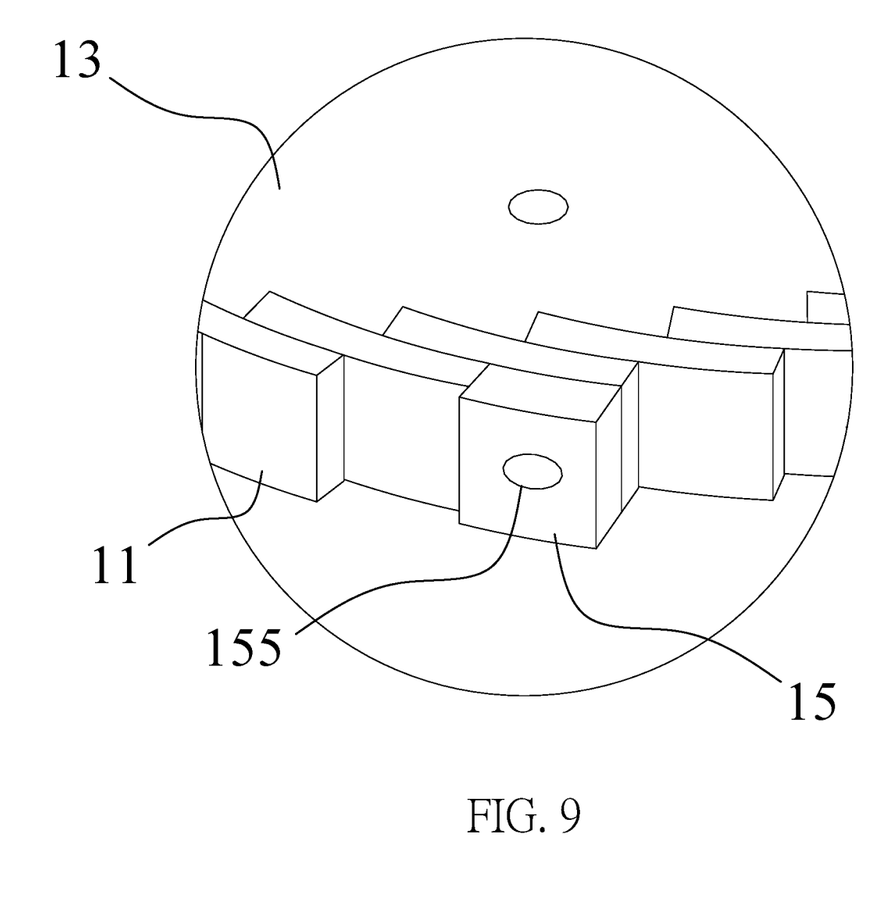
FIG. 9 is the second partial three-dimensional view of the magnetic rotary disc of the present invention.
Figure 10:
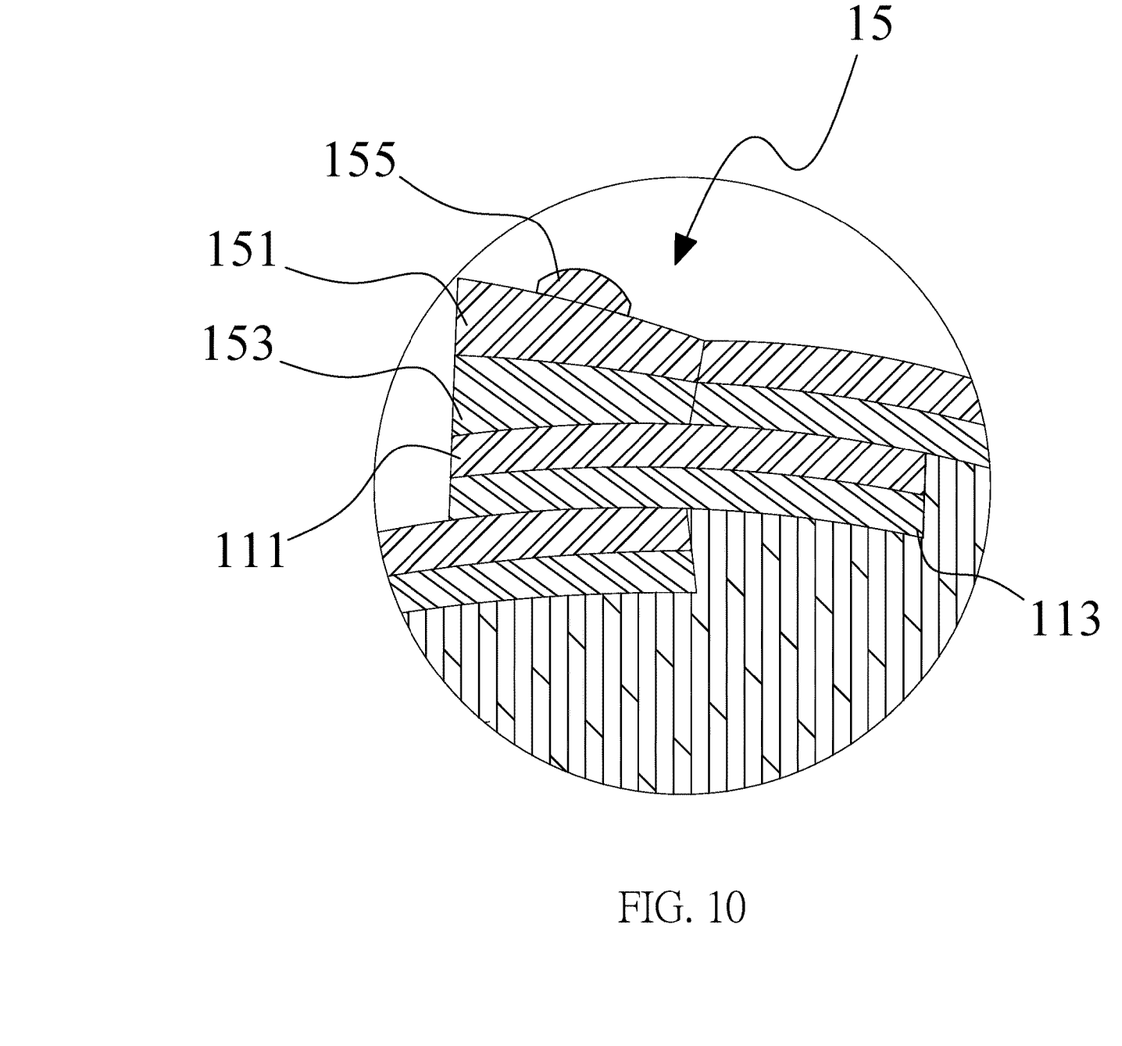
FIG. 10 is the fourth partial cross-sectional view of the magnetic rotary disc of the present invention.

Please refer to FIG. 9 and FIG. 10, wherein FIG. 9 shows the second partial three-dimensional view of the magnetic rotary disc of the present invention, and FIG. 10 shows the fourth partial cross-sectional view of the magnetic rotary disc of the present invention. As shown in the figures, according to one or more embodiments, in order to make the concentration and reinforcement effect of the magnetic force lines better, the upper side of the first magnetic pole portion 111 of any magnetic elements 11 of each interval of a certain number, and an additional magnetic element 15 can also attract each other. According to one or more embodiments, the additional magnetic element 15 may also be in the form of sheet structure having a curvature. However, it should be noted that, the area of the additional magnetic element 15 should in principle be smaller than its attracted magnetic element 11, because the upper side of the first magnetic pole portion 111 of the attracted magnetic element 11 and the lower side of the second magnetic pole portion 113 of the other magnetic element 11 attract each other. Similarly, due to the amount of the magnetic elements 11 is between 6 and 96 in the best embodiment of the present invention, the upper side of the first magnetic pole portion 111 of the magnetic elements 11 of each interval of 6, and an additional magnetic element 15 can also attract with each other. Accordingly, the amount of the additional magnetic elements 15 could be between 1 and 16.

As shown in FIG. 10, according to one or more embodiments, the additional magnetic element 15 comprise a first magnetic pole portion 151 and a second magnetic pole portion 153. When the upper side of the first magnetic pole portions 111 of any magnetic elements 11 and the additional magnetic element 15 further attract with each other, the first magnetic pole portion 111 of the magnetic element 11 and the second magnetic pole portion 153 of the additional magnetic element 15 attract each other, and the magnetic field between them will be balanced off. Similarly, when the upper side of the first magnetic pole portions 111 of any magnetic elements 11 and the additional magnetic element 15 further attract with each other, the additional magnetic element 15 half cover the attracted first magnetic pole portions 111 of the magnetic elements 11, so as to implement that only the magnetic force lines of the first magnetic pole portions 111 and the first magnetic pole portion 151 are retained outside the peripheral edge of the metal rotary body 13, i.e., some of the first magnetic pole portions 111 will be covered by the additional magnetic element 15, and the magnetic force lines of the first magnetic pole portions 111 will be replaced with the magnetic force lines of the additional magnetic element 15.

As shown in FIG. 9 and FIG. 10, according to one or more embodiments, the first magnetic pole portions 151 of the additional magnetic elements 15 also respectively comprises a magnetic force concentration portion 155 and an inclined surface where the magnetic force concentration portion 155 is arranged on. The function of the additional magnetic force concentration portion 155 is to concentrate and strengthen the magnetic forces of the associated magnetic poles, and to make the magnetic forces of the magnetic poles more gradational and more directional, so that the magnetic poles interaction with the external magnetic field can be performed more efficiently. It is worth mentioning that, although the area of the additional magnetic elements 15 should in principle be smaller than its attracted magnetic elements 11, the thickness of thinner side of the additional magnetic elements 15 in the form of sheet structure should be equal to the magnetic elements 11 also in the form of sheet structure, so that the additional magnetic elements 15 will optimize the effect of the concentration and reinforcement of the magnetic forces.

Figure 11:
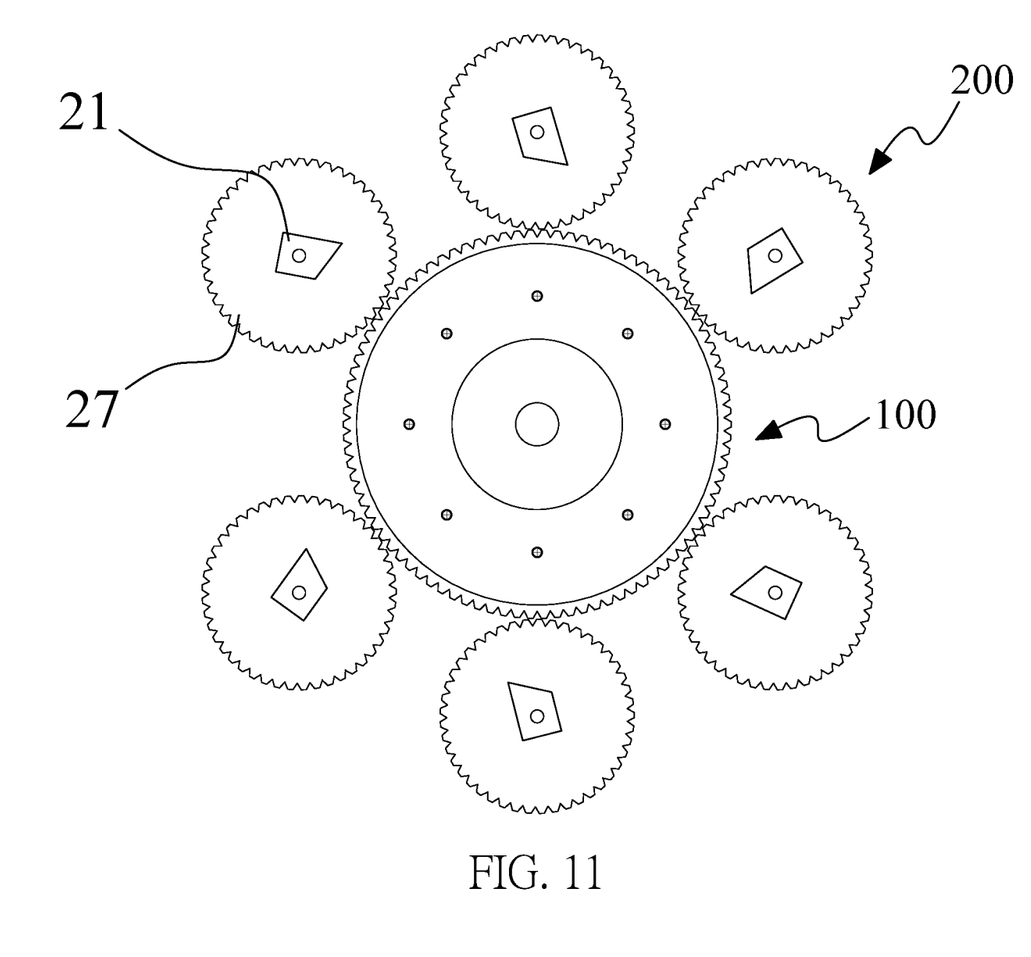
FIG. 11 is a schematic view of the operation of the magnetic rotor of the present invention.

Please refer to FIG. 11, which shows a schematic view of the operation of the magnetic rotor of the present invention. As shown in the figures, according to one or more embodiments, a plurality of guide rotors 200 may be arranged on outside the peripheral edge of the magnetic rotor 100. The guide rotors 200 are mainly composed of a magnetic guide element 21 and a transmission disc 27. The magnetic guide element 21 of the guide rotor 200 is provided corresponding to the magnetic elements 11 or the magnetic elements 15 of the magnetic rotor 100. There is magnetic poles interaction between them. Furthermore, the magnetic guide element 21 of the guide rotor 200 has an inclined surface corresponding to the magnetic force concentration portion 155 on the inclined surface of the magnetic elements 15, so as to optimize the interaction between the magnetic poles. The transmission disc 27 of the guide rotor 200 is provided corresponding to the transmission disc 7 of the magnetic rotor 100. They are engaged with each other. It is worth mentioning that, the transmission disc 27 of the magnetic guide element 21 of the guide rotors 200 also has a plurality of transmission teethes, and the amount of the transmission teethes is equal to the amount of the transmission teethes of the transmission substrate 7 of the magnetic rotor 100, so as to be synchronously rotated. Through the interaction between the transmission disc 27 of the guide rotor 200 and the magnetic rotor 100, the magnetic rotor 100 only needs extremely small electric energy supply, then high-efficiency magnetic poles interaction with the guide rotor 200 can be achieved, so as to perform smooth and high-speed rotary motion. Therefore, through the magnetic rotor 100 provided by the present invention, it is only required a very small amount of electric energy to generate a great amount of mechanical energy, and the mechanical energy can generate electric energy more efficiently, thereby implementing the new concept of "Power and Power Cogeneration".

In the description above, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form. There may be intermediate structure between illustrated components. The components described or illustrated herein may have additional inputs or outputs that are not illustrated or described. The illustrated elements or components may also be arranged in different arrangements or orders, including the reordering of any fields or the modification of field sizes.

An embodiment is an implementation or example of the invention. Reference in the specification to "an embodiment", "one embodiment", "some embodiments", or "other embodiments" means that a particular feature, structure, or characteristic described in connection with the embodiments is included in at least some embodiments, but not necessarily all embodiments. The various appearances of "an embodiment", "one embodiment", "some embodiments", or "other embodiments" are not necessarily all referring to the same embodiments. It should be appreciated that in the foregoing description of exemplary embodiments of the invention, various features of the invention are sometimes grouped together in a single embodiment, figure, or description thereof for the purpose of streamlining the disclosure and aiding in the understanding of one or more of the various inventive aspects.

The present invention truly has novelty, inventive step and industrial applicability, and the patent application requirements stipulated in the patent law should be undoubted. Therefore, an application for patent of invention shall be filed according to the patent law. We sincerely and gratefully pray for the grant of patent from the Bureau as soon as possible.

What is claimed is:

1. A magnetic rotary disc comprising:
   a metal rotary body;
   a plurality of magnetic elements arranged on peripheral edge of the metal rotary body in a uniform distribution with long strip shape, each of the magnetic elements respectively comprises a first magnetic pole portion and a second magnetic pole portion, and the first magnetic pole portions and the second magnetic pole portions respectively belong to radially outer portion and radially inner portion of the magnetic elements, wherein the amount of the magnetic elements is 2×3 N or 6×N, wherein N is a positive integer between 1 and 16; and
   a plurality of division plates, arranged on an upper axial side and a lower axial side of the magnetic rotary disc, isolating the magnetic fields on the upper axial side and the lower axial side of the magnetic rotary disc;
   wherein the radially inner side of the second magnetic pole portion of any magnetic elements and the radially outer side of the first magnetic pole portion of the other magnetic elements partially attract each other, so that only the magnetic force lines of the first magnetic pole portions are retained outside the peripheral edge of the metal rotary body to interact with a plurality of guide rotors, arranged on outside of the metal rotary body, wherein the plurality of guide rotors are mainly composed of a magnetic guide element and a transmission disc and provided corresponding to the magnetic elements;
   wherein the radially outer portion, radially outer side, radially inner portion and radially inner side are in respect to the rotation axis of the metal rotary body.

2. The magnetic rotary disc of claim 1, wherein the peripheral edge of the metal rotary body comprises a plurality of slots in corresponding number, so that the attractions of the magnetic elements are provided.

3. The magnetic rotary disc of claim 1, wherein the metal rotary body is a circular disc or a circular ring.

4. The magnetic rotary disc of claim 1, wherein the magnetic elements are sheet structure having a curvature.

5. The magnetic rotary disc of claim 1, wherein the first magnetic pole portion and the second magnetic pole portion of the magnetic elements respectively occupy a half thereof.

6. The magnetic rotary disc of claim 1, wherein the second magnetic pole portions are S pole if the first magnetic pole portions are N pole, whereas the second magnetic pole portions are N pole if the first magnetic pole portions are S pole.

7. The magnetic rotary disc of claim 1, wherein the radially outer side of the first magnetic pole portion of any magnetic elements and an additional magnetic element further attract with each other, so as to concentrate magnetic force nearby.

8. The magnetic rotary disc of claim 7, wherein the first magnetic pole portion of the additional magnetic element further comprises a magnetic force concentration portion and an inclined surface where the magnetic force concentration portion is arranged on.

9. The magnetic rotary disc of claim 1, wherein the metal rotary body comprises iron.

10. The magnetic rotary disc of claim 1, wherein the magnetic guide element has an inclined surface.

* * * * *